United States Patent [19]

Madou et al.

[11] Patent Number: 4,973,391
[45] Date of Patent: Nov. 27, 1990

[54] COMPOSITE POLYMERS OF POLYANILINE WITH METAL PHTHALOCYANINE AND POLYANILINE WITH ORGANIC SULFONIC ACID AND NAFION

[75] Inventors: Marc J. Madou, Palo Alto; Takaaki Otagawa, Fremont, both of Calif.

[73] Assignee: Osaka Gas Company, Ltd., Osaka, Japan

[21] Appl. No.: 238,571

[22] Filed: Aug. 30, 1988

[51] Int. Cl.$^5$ ............................................ C25B 3/02
[52] U.S. Cl. ....................................... 204/78; 204/72
[58] Field of Search ........................ 204/59 R, 72, 78

[56] References Cited

U.S. PATENT DOCUMENTS

| | | | |
|---|---|---|---|
| 4,404,069 | 9/1983 | Goodin et al. | 204/59 R |
| 4,468,291 | 8/1984 | Naarmann et al. | 204/59 R |
| 4,571,029 | 2/1986 | Skotheim et al. | 350/357 |
| 4,586,792 | 5/1986 | Yang et al. | 350/357 |

OTHER PUBLICATIONS

Jiang et al; "Research on Chemically Modified Electrodes, Catalytic Reduction of Dioxygen at a Cobalt Phthalocyanine-Doped Polyaniline Film Electrode", J. Electroanal. Chem., 246 (1988) 101–117.

Hira; et al; "Electrochemical Behaviors of Polypyrrole, Poly-3-methylthiophene, and Polyaniline Deposited on Nafion-Coated Electrodes", J. Electrochem. Soc. 135(5) 1132–1137 May 1988.

Primary Examiner—John F. Niebling
Assistant Examiner—Steven P. Marquis
Attorney, Agent, or Firm—Phillips, Moore, Lempio & Finley

[57] ABSTRACT

The present invention relates to a process for the production of an electrochromic electrically conductive composite membrane, which process comprises:
(a) combining aniline and metal phthalocyanine in dilute hydrochloric acid; and
(b) applying to the solution of step (a) a constant current density of between about 0.05 and 0.2 milliamperes/cm$^2$ for between about 1 to 10 minutes on an electrode selected from a transparent platinum electrode or an ITO electrode to produce the improved electrically conductive electrochromic membrane. The present invention also relates to a process for the production of an electrically conductive composite membrane which comprises:
(a) combining aniline, organic sulfonic acid and NAFION ® all in the acid form and electropolymerizing the aqueous solution to obtain the polyaniline thin film. The electrochromic electrically conductive composite membrane produced by the process is described which is colorless when subjected to between about $-0.3$ V to 0 V and green to blue when subjected to between 0 V and $+0.6$ V. These films are useful in electrochromic displays.

10 Claims, 12 Drawing Sheets

| Starting Materials (Concentration) | Polymerization Conditions | Test Electrolyte | Wavelength (nm) | Potential (V vs. SCE) | Switching Time (ms) |
|---|---|---|---|---|---|
| 1. HCl (2 M)<br>aniline (1 M)<br>(conventional) | +0.1mA/cm$^2$<br>(0.024C/cm$^2$) | 1 M HCl | 600<br><br>700 | -0.2 to 0.7<br>0 to 0.6<br>-0.2 to 0.7<br>0 to 0.6 | 150<br>15<br>50<br>90 |
| 2. 1M HCl (2 M)<br>aniline (1 M)<br>NiPc/SO$_3^-$ (1 mM) | +0.1mA/cm$^2$<br>(0.024C/cm$^2$) | 1 M HCl | 600<br><br>700 | -0.2 to 0.7<br>0 to 0.6<br>-0.2 to 0.7<br>0 to 0.6 | 80<br>70<br>90<br>100 |
| 3. Tosylate (1 M)<br>aniline (0.1 M)<br>NiPc/SO$_3^-$ (1 mM) | +0.1mA/cm$^2$<br>(0.030C/cm$^2$) | 1 M HCl | 600<br><br>700 | -0.2 to 0.7<br>0 to 0.6<br>-0.2 to 0.7<br>0 to 0.6 | 50<br>20<br>40<br>40 |
| 4. Tosylate (1 M)<br>aniline (0.1 M)<br>NiPc/SO$_3^-$ (1 mM)<br>Nafion* | +0.1mA/cm$^2$<br>(0.030C/cm$^2$) | 1 M HCl | 700 | 0 to 0.6 | 200 |

*Ethanolic pre-ion-exchanged Nafion (50 μL/cm$^2$) is solution-cast on the electrode before polymerization. The thickness of Nafion may be ~1 μm.

COMPOSITE POLYMERS OF POLYANILINE WITH METAL PHTHALOCYANINE AND POLYANILINE WITH ORGANIC SULFONIC ACID AND NAFION

BACKGROUND OF THE INVENTION

1. Field of the Invention

The present invention concerns an electrically conductive composite membrane of polyaniline with metal phthalocyanine and polyaniline with sulfonic acid and/or NAFION ®. Specifically, the present invention is to a process for the electropolymerization and production of an electrically conductive composite membrane of polyaniline with metal phthalocyanine, and polyaniline with organic sulfonic acid and NAFION ®, and the product electrochromic polymers of these electropolymerizations.

2. Description of Relevant Art

Organic conducting polymers such as polypyrrole (PPy), polythiophene (PTP), polyaniline (PAn or PAN) and their derivatives are gaining in popularity for potential use in optical, electronic and electrochemical devices. See, for example, F. Garnier et al., *Journal of Electroanalytical Chemistry* (1983), Vol. 148, p. 299; H. Kaezuka, et al., *Journal of Applied Physics* (1983), Vol. 54, p. 2511; and A. Mohammadi et al., *Journal of the Electrochemical Society* (1986), Vol. 133, p. 947.

A major disadvantage of these electrically conducting polymers in any configuration is that they have poor mechanical properties. See, for example, O. Niwa, et al., *Journal of the Chemical Society* (1984), p. 817; S.E. Lindsey, et al., "Synthetic Methods," (1984/1985), Vol. 10, p. 67; F.R.F.Fan, et al., *Journal of the Electrochemical Society*, Vol. 133, p. 301; and R. M. Penner, et al., *Journal of the Electrochemical Society* (1986), Vol. 133, p. 310.

Several approaches may be useful to improve the physical and mechanical properties of the conducting polymers. For instance, the polymerization of pyrrole in thick electroactive polymer networks such as poly(vinyl chloride), poly(vinyl alcohol), NAFION ® and NAFION ® impregnated GORE-TEX ® has been reported in the literature.

T. Hirai, et al., *Journal of the Electrochemical Society* (1988), Vol. 135 (#5), p. 1132–1137 reported that the anodic polymerization of pyrrole, 3-methylthiophene and aniline at NAFION ®-coated electrodes gives electrically conducting polyaniline (NAFION ®) composite films. These composites show an improvement of the polypyrrole electrochromic response and by the efficient utilization of stored charge by the composite film electrodes. All references cited in this application are incorporated herein by reference.

It is therefore desirable to obtain electrically conducting polymers of polyaniline (PAN) with an added dopant and/or on a substrate which have improved electrochromic properties. The present invention accomplishes that objective.

SUMMARY OF THE INVENTION

In one aspect of the present invention relates to an electrically conducting polymer of polyaniline which is doped with a small amount of metal phthalocyanine tetrasulfonic acid, preferably as its tetrasodium salt.

In another aspect, the present invention relates to a process to prepare an improved electrochromic polymer, which process comprises:

(a) electropolymerizing aniline in an aqueous acid solution in the presence of a metal phthalocyanine sulfonic acid, preferably as its tetrasodium salt.

In another aspect the present invention concerns an electrochromic electrically conductive composite membrane, which comprises an electropolymerized polyaniline with an organic sulfonic acid and a NAFION ® substrate.

In another aspect, the present invention relates to a process for the production of an electrochromic electrically conductive composite membrane, which process comprises:

(a) combining aniline and organic sulfonic acid both in the acid form; and (b) applying to the solution of step (a) a constant current density of between about 0.05 and 0.2 milliamperes/cm$^2$ for between about 1 to 10 minutes on an electrode selected from an optically transparent platinum electrode or an optically transparent indium-tin-oxide (ITO) electrode to produce the electrically conductive electrochromic membrane.

In another aspect, the present invention relates to the above process of preparing an electrochromic electrically conductive composite wherein the aniline in step (a) is between about 0.1M to 1M and the organic sulfonic acid is present in between about 1M and 2M.

In another aspect, the present invention relates to electrochromic electrically conductive composite membrane produced by the above process which is colorless when subjected to between about $-0.3$ V to 0 V and green to blue when subjected to between about 0 V and $+0.6$ V.

BRIEF DESCRIPTION OF DRAWINGS

In FIG. 3, in reactions #2, #3 and #4, the NiPc/So$_3$- is present as the tetrasulfonic acid tetrasodium salt and is converted to be in the acid form.

DETAILED DESCRIPTION OF THE INVENTION AND PREFERRED EMBODIMENTS

Definitions

As used herein,

"Gore-Tex ®" is a porous polymer (usually a film) of polytetrafluoroethylene available from the A.E. Gore Company of Elkton, Maryland GORE-TEX ® is a trademark of A.E. Gore Co. for commercially available polymer or membrane..

"Metal" refers to the metal ion in the phthalocyanine such as nickel, cobalt, iron, manganese or the like. Nickel or cobalt is preferred, especially nickel.

"NAFION ®" is a fluorinated organic polymer having multiple pendant sulfonic acid groups. NAFION ® is a trademark of DuPont Company for a commercially polysulfonated membrane or solution. NAFION ® has the following structure:

It is a copolymer of polytetrafluoroethane and polysulfonylfluoride vinyl ether. About one in eight monomer units is sulfonated. It may be obtained from Solution Technology, Inc. of Phila., PA. The NAFION ® of this invention is used in the acid form (—$SO_3$—). This form may be obtained by performing the electropolymerization with sufficient acid (e.g. mineral acid, hydrochloric acid, sulfuric acid, etc) or the acid form may be obtained by prior acidification or by ion exchange of the salt (sodium) form with acid.

"Organic sulfonic acid" refers to those organic sulfonic acids of the art of the structure: R - $SO_3H$, where R is alkyl having 1 to 10 carbon atoms (methyl, ethyl, propyl, butyl, decyl, trifluoromethyl and the like.) R is also an aromatic moiety such as benzene, toluene, naphthalene and the like. Additional sulfonic acids include dodecylbenzenesulfonic acid, poly(vinyl sulfonic acid), poly(styrene-4-sulfonic acid), chemically modified NAFION ® solution, 2,3,5-Trichlorobenzenesulfonic acid and vinyl phenyl sulfonic acid. p-Toluenesulfonic acid is preferred.

"Phthalocyanine" (Pc) refers to the unsubstituted phthalocyanine and to the substituted phthalocyanine. The preferred substitution is for 1 or more sulfonic acid groups: —$SO_3H$. Preferably, the phthalocyanine is substituted by four sulfonic acid groups (—$SO_3H$). In this invention the preferred phthalocyanine is metal phthalocyanine tetrasulfonic acid. If the phythalocyanine is present as the tetrasodium salt it needs to be converted into the tetracid form (—$SO_3$—). This conversion occurs by (1) pretreating the tetrasodium salt under ion exchange conditions, or (2) conducting the electropolymerization in the presence of sufficient acid to obtain the tetraacid form (—$SO_3$—)

Polyaniline has recently emerged as one of the most promising polymer battery electrodes (K. Kitani et al., *Journal of the Electrochemical Society*, Vol. 133 (#6), p. 10690–1073 (1986); M. Macdiarmid, et al., *Cryst. Liq. Cryst.*, Vol 121, p. 187–190 (1985). One of the more interesting characteristics of this polymer is its stability in both air and water.

Apparatus

Figure 1A:
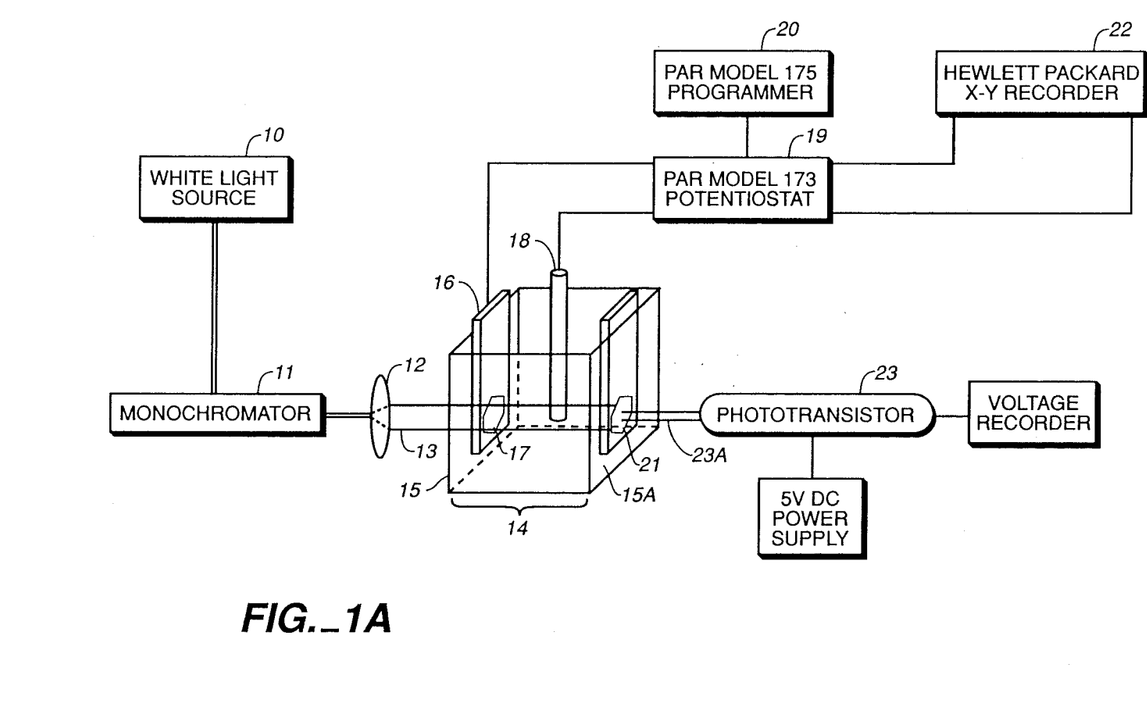
FIG. 1A shows schematically the experimental equipment setup for the equipment used to evaluate the electrochromic properties of polymer films.

FIG. 1A depicts schematically the experimental setup used to evaluate polymer performance. Light source 10 consists of a Kodak slide projector having a light beam 10A focused into a Bausch and Lomb Model 33-8-02 monochromator 11 to provide near-coherent light 11A at the desired wavelength. Convex lens 12 is used to defocus the light from the monochromator to a round beam 13. Electrochemical cell 14 is constructed with optically flat glass plates 15 and 15A through which the light beam 13 is passed. Counter electrode 16 is a platinum sheet with a hole 17 which the light beam 13 can pass (as beam 13). A saturated calomel electrode (SCE) is used as the reference electrode 18. A Princeton Applied Research (PAR) Model 173 potentiostat 19 is used in conjunction with a PAR Model 175 universal programmer 20 to control the potential of the polymer electrode 21. The response times of the electrochromic film 21 are determined using an x-y recorder 22 which has an intrinsic response time of approximately 10 milliseconds (ms). The response time and the intensity of the color change are determined from an intensity vs. time curve obtained using a computerized data acquisition system-27, 28 (Macintosh-MacADIOS), See FIG. 1B. The response time is defined as the time necessary for an electrochromic film to reach 90 percent of a steady-state response after the voltage is changed.

Phototransistor Calibration

The optical transmittance of experimental polymers (i.e. the intensity of the transmitted light 23A through the conducting polymer) was measured using a Fairchild Type FPT 100 npn phototransistor 23. Light beam 23A is less intense than light beam 13A because of absorption by electrochromic film 21. The photodetector amplitude and time response were calibrated for several wavelengths of light using a Laser Precision Inc., Model RK5100 Pyroelectric Radiometer light-measuring device and a Tektronix Model 8844 dual-beam oscilloscope, respectively. A typical amplitude and response-time of approximately 1.5 microseconds ($\mu$s) is more than adequate for the test of the polymer films, which typically have response times greater than 0.1 sec.

Nickel-Phthalocyanine-Doped Polyaniline Films

Figure 2A:
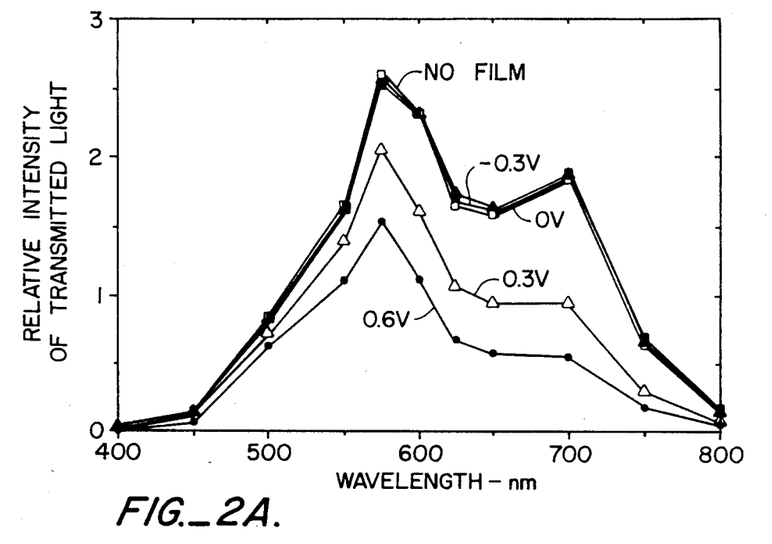
FIGS. 2A and 2B are graphic plots of the intensity of transmitted light versus wavelength as a function of the time for polyaniline in the presence of nickel phthalocyanine (2A) and polyaniline without phthalocyanine (2B).
Figure 2B:
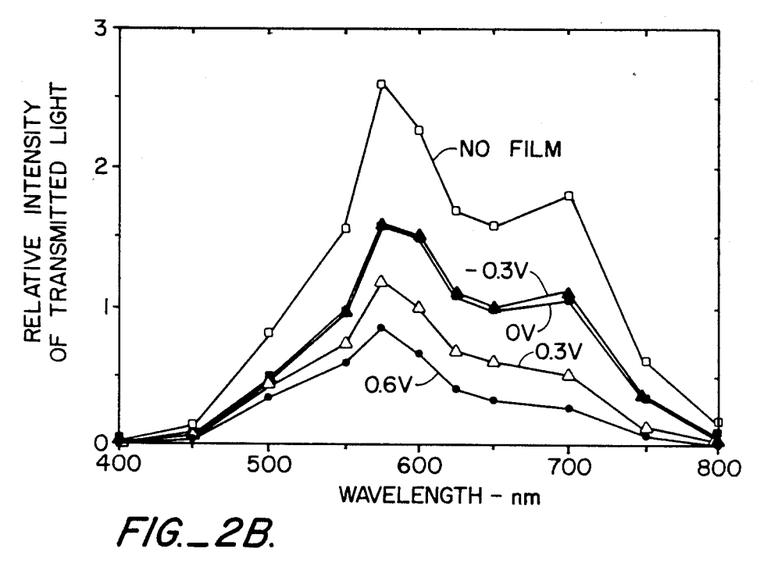

FIGS. 2A and 2B show plots of intensity of transmitted light vs. wavelength as a function of time for polyaniline with Ni-Pc, FIG. 2A and polyaniline without Ni-Pc, FIG. 2B. The films were prepared applying a constant current density of between about 0.01 and 1mA/ $cm^2$, preferably about 0.1 mA/$cm^2$, for between about 1 and 10 minutes preferably about 4 minutes, on transparent platinum electrode of a solution containing between about 1 M and 3 M acid, preferably about 2 M HCl, and 1 M aniline, with or without additional 1 mM Ni-Pc/$SO_3$. Other metals which may be used with the phthalocyanine include, for example, cobalt, manganese, iron and the like. The electrochromic properties of the films were characterized in 1 M HCl.

The results show no substantial improvement in the response time after the incorporation of Ni-Pc tetrasulfonate into the polyaniline films; however, it is observed the following improvements in the electrochromic properties after the incorporation of Ni-Pc:

A large change in the intensity of transmitted light was observed; and

A nearly colorless film was obtained at −0.3 V to 0 V vs. SCE.

Figure 1B:
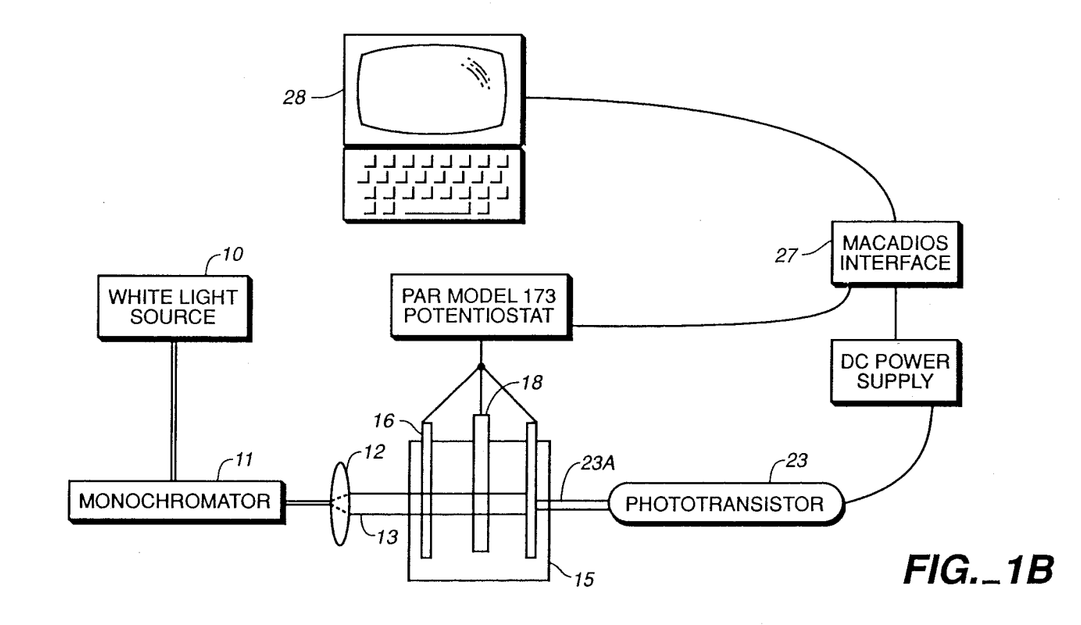
FIG. 1B shows the experimental equipment setup including the computer interface.

FIG. 2A shows that the intensity of the transmitted light through the film is identical to that of the transmitted light through a transparent platinum electrode with no film over a wide range of wavelength (400 nm to 800nm). This means that a colorless film is made by applying a voltage in the range of −0.3 V to 0V to the Ni-Pc doped polyaniline film. The film changes from colorless to green and to blue upon the application of −0.3 V to +0.6 V. On the other hand, the results in FIG. 1B show that the polyaniline film without Ni-Pc does not become colorless under any level of applied voltage, and the color changes from yellow-green to green-blue and to dark blue as the potential changes from −0.3 V to +0.6 V (this film may be useful when a darker color is needed). From the two results in FIG. 2A or 2B, it is clear that the polyaniline film with Ni-Pc/tetrasulfonate also gives rise to a greater light intensity change, especially at wavelengths 600 to 700 nanometer (nm).

Electrochromic Films Based on Polyaniline/Tosylate/with and without NAFION ®.

A major drawback of the Ni-Pc-doped polyaniline electrochromic film is that the reproducibility of the film is poor because Ni-Pc does not easily dissolve in the acidic solution needed to dissolve aniline. Ni-Pc dissolves well in an aqueous solution containing tosylate (e.g., p-toluenesulfonic acid). Uniform, homogeneous electrochromic films comprising polyaniline/tosylate were formed only when Ni-Pc/SO$_3$ was added to the polymerization solution. In parallel to the optimization study conducted for the polymeric battery electrode, the ratio of aniline to tosylate is optimized, ranging from 0.1 M to 1 M for aniline and 1 M to 2 M for tosylate. The best results are obtained when 0.1 M of aniline and 1 M of tosylate are used.

Figure 3:
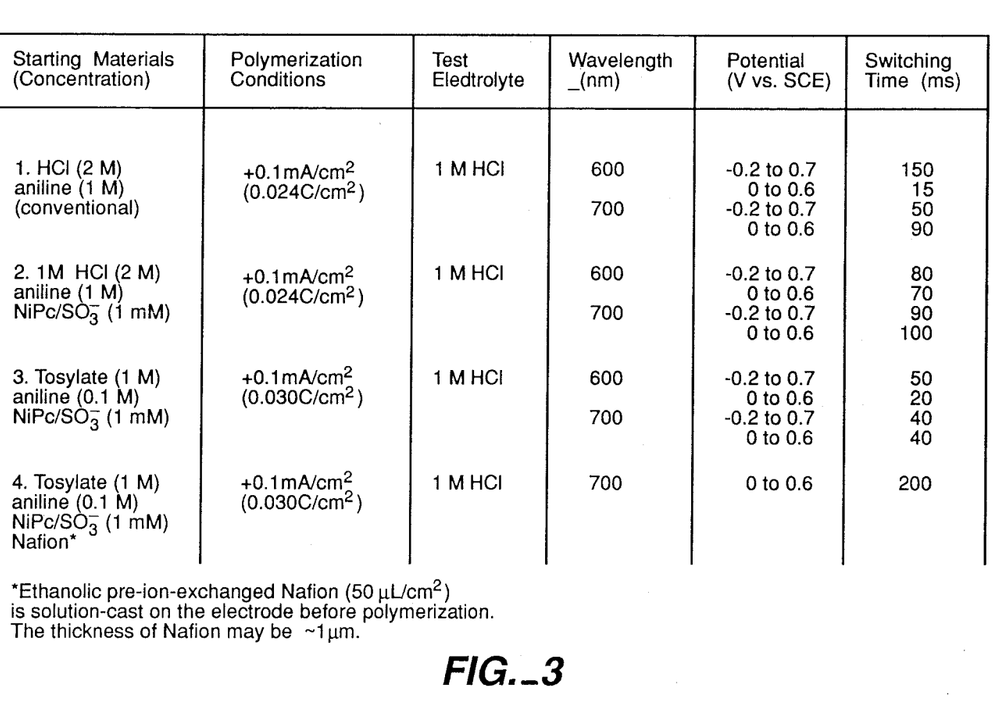
FIG. 3 is a table showing a summary of electrochromic switching times for four different electrochromic films.

The table in FIG. 3 compares film composition in terms of starting materials and switching time of four different electrochromic films that are prepared on ITO. In general, the switching times are fast, compared to the data obtained with the transparent platinum electrode. This should be due to the difference in the electrode resistance (ITO 5–10 ohms per centimeter$^2$; platinum 100 ohms per centimeter$^2$). The best switching time was obtained with the polyaniline/tosylate system. Also, this film shows the best film uniformity among the films studied.

Figure 4A:
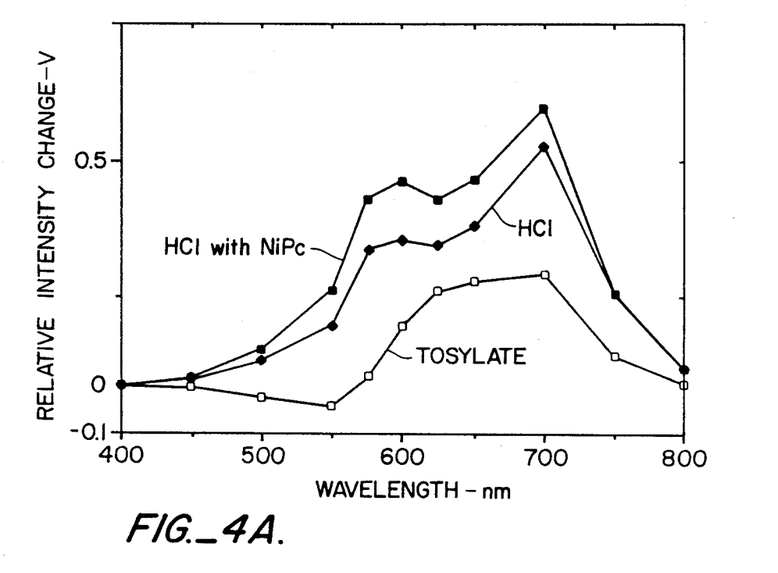
FIG. 4 shows a graphic plots of relative intensity change versus intensity change versus wavelength for three electrochromic films
Figure 4B:
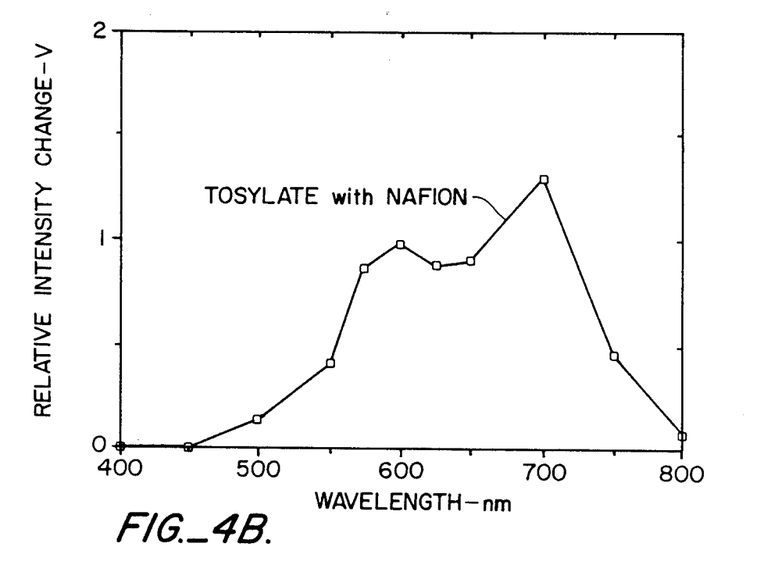
FIG. 4B is the graphic plot of the tosylate with Narfion.

FIGS. 4A and 4B show plots of relative intensity change vs. wavelength for the four electrochromic films. The relative intensity change is defined as the difference in intensity of transmitted light at −0.3 V and at +0.6 V. All the films but one exhibited an almost identical intensity vs. wavelength relationship. The degree of color range of a different sample polyaniline/tosylate/Ni-Pc film is relatively small, compared to the others, changing only from yellow-green to blue. These results suggest that Ni-Pc is indeed incorporated into the film when tosylate is present.

Figure 5A:
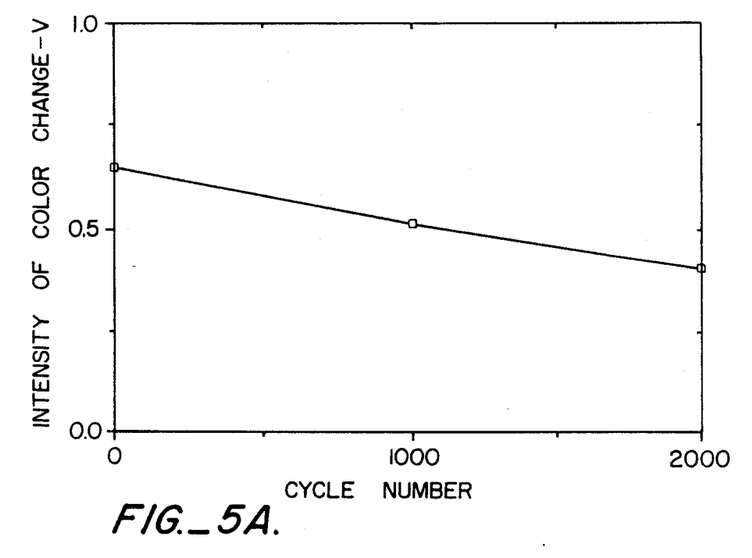
FIG. 5A, 5B and 5C show the results of a long cycle test for the three selected electrochromic films deposited on ITO listed in FIG. 3.
Figure 5B:
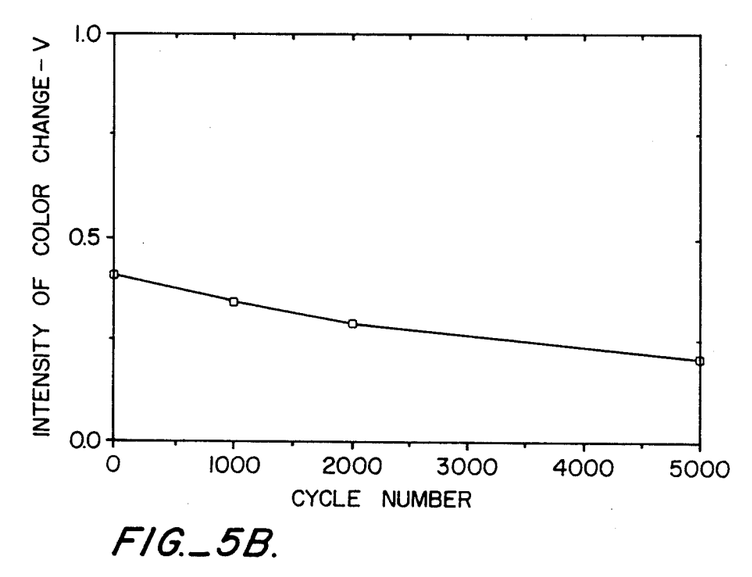
Figure 5C:
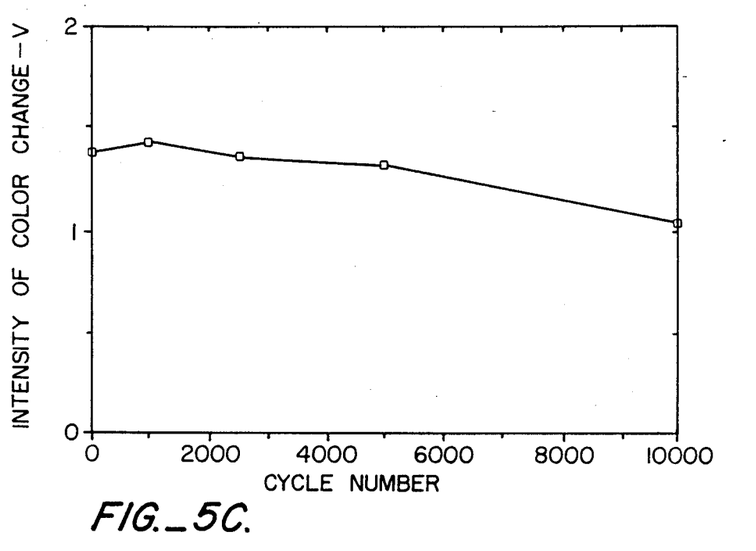
Figure 5D:
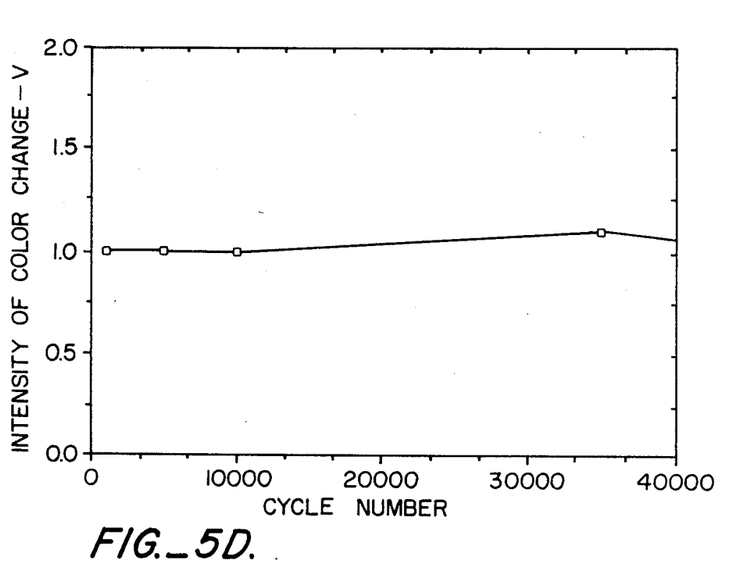
FIGS. 5D, 5E and 5F show the results of a long cycle test for films deposited on transparent platinum electrodes.
Figure 5E:
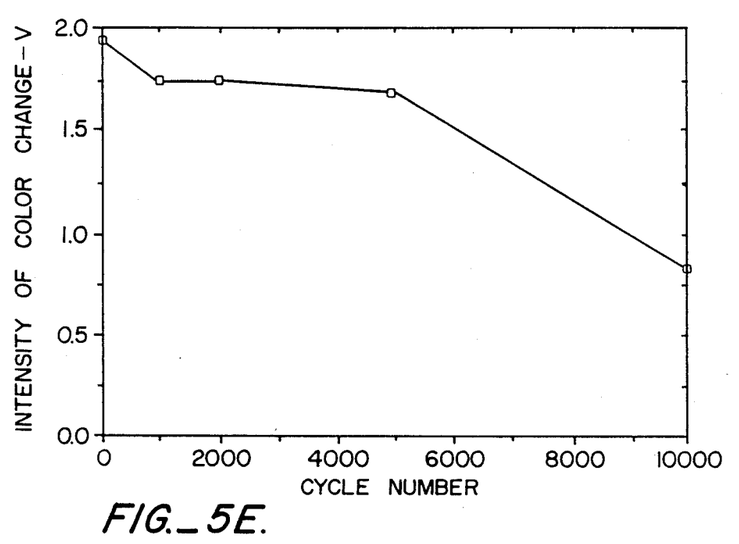
Figure 5F:
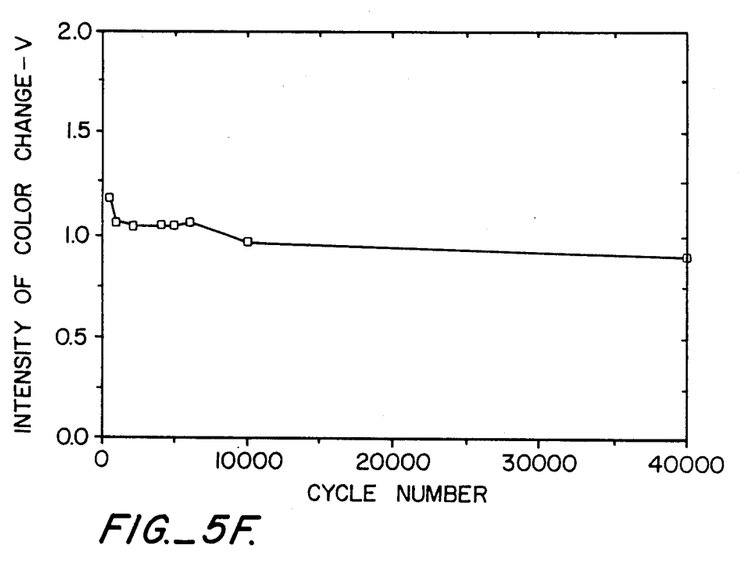

FIGS. 5A to 5C show the results of a long cycle test for the three selected electrochromic films listed in the table in FIG. 3. The intensity of color change at a wavelength of 700 nm and the response time are plotted against cycle number. One cycle corresponds to a pulse consisting of 0 V for 1 second and +0.6 V for 1 second. The lifetime of the polyaniline/HCl was much longer than that of the polyaniline/tosylate/Ni-Pc. However, the lifetime of the latter was greatly improved when the film was polymerized into a NAFION ® film. The intensity of color change of the polyaniline/tosylate/Ni-Pc/Nafion is greater by a factor of two than that for the same film without NAFION ®. These data may suggest that it is easier to grow a polyaniline/ tosylate film in NAFION ®. The longest lifetime is obtained with the polyaniline/tosylate/Ni-Pc/NAFION ® (Sample 4-FIG. 5D). However, after the test is completed, rinsing with water caused the film to peel off, indicting that ITO itself and/or adhesion between ITO and NAFION ® is degraded during the testing. Therefore, the long-term cycling test is repeated using films prepared on the glass coated with ultrathin platinum. The results are presented in FIGS. 5D, 5E and 5F. The use of the transparent platinum electrodes, in general, lengthens the lifetime by a factor of 3 to 4 and slows the response time. The best result in terms of lifetime was again obtained with the polyaniline/tosylate/Ni-Pc/Nafion, which showed a life of $4 \times 10^4$ cycles.

It should be mentioned that, during the cycle test of the polyaniline/HCl film made on platinum (cf FIG. 5F), the color of the electrolyte changed from colorless to light yellow, indicating that some of the polyaniline dissolved in the electrolyte because of film degradation. It is difficult to grow a polyaniline/HCl film into NAFION ®; the resulting film showed no improvement in lifetime over a pure polyaniline/HCl film.

Effect of Electrolyte

In the lifetime test, the polyaniline film prepared with tosylate is tested in 1 M tosylate solution (pH 0.38) and the polyaniline film prepared with HCl was tested in 1 M HCl (pH 0.33). In the next set of experiments, the two polyaniline electrochromic films are prepared on ITO (polyaniline/HCl made from 1 M aniline and 2 M HCl; polyaniline/tosylate/Ni-Pc/NAFION ® made from 0.1 M aniline, 1 M tosylate, and 1 mM Ni-Pc/SO$_3$) are evaluated in both 1 M tosylate and 1 M HCl to study the effect of electrolyte on lifetime.

Figure 6A:
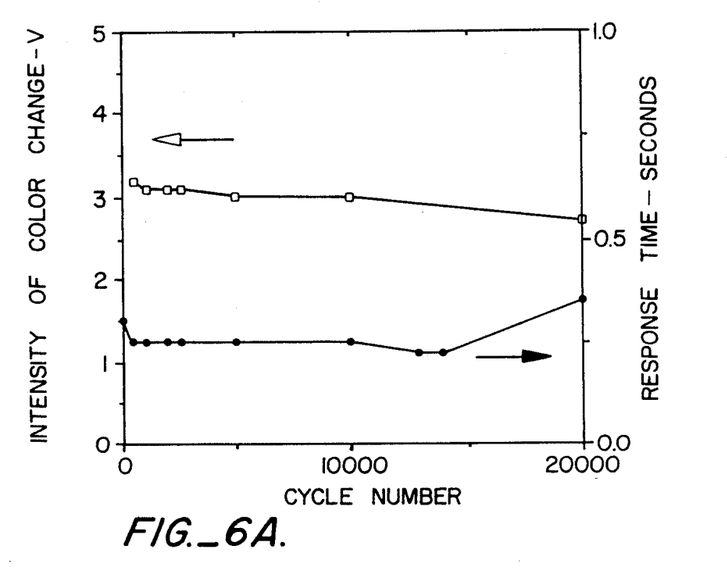
FIGS. 6A, 6B, 6C and 6D show a graphic plot of the effect of the electrolyte on the lifetime of two polyaniline-based electrochromic films prepared on an ITO electrode.
Figure 6B:
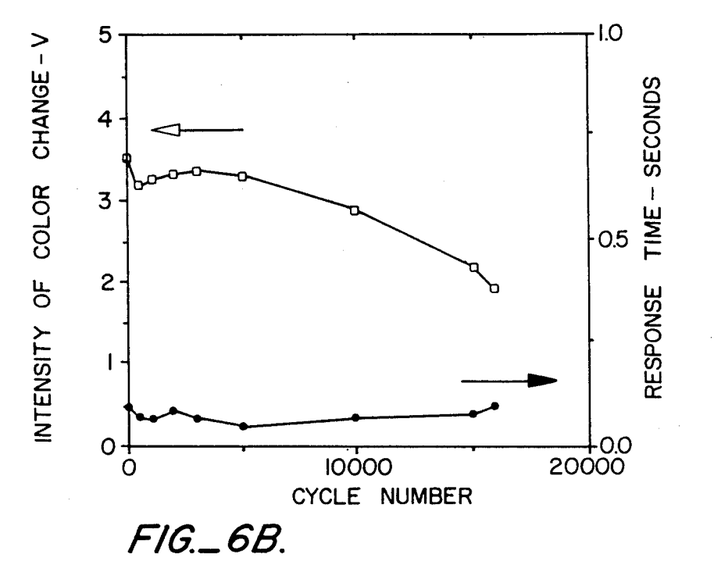
Figure 6C:
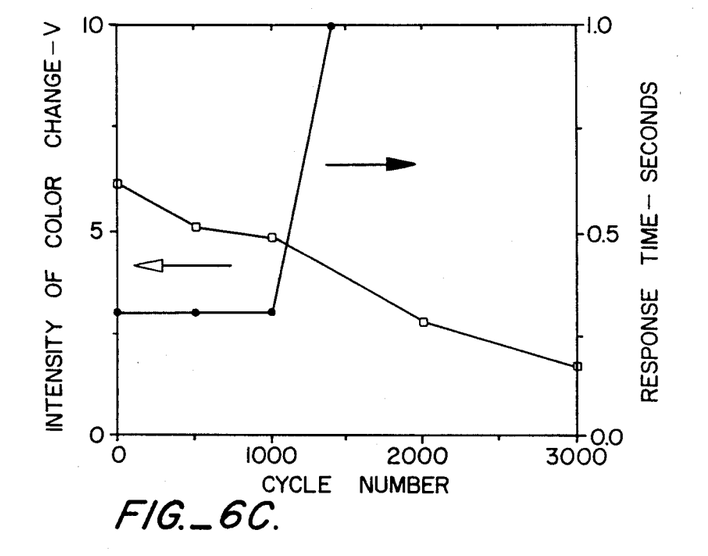
Figure 6D:
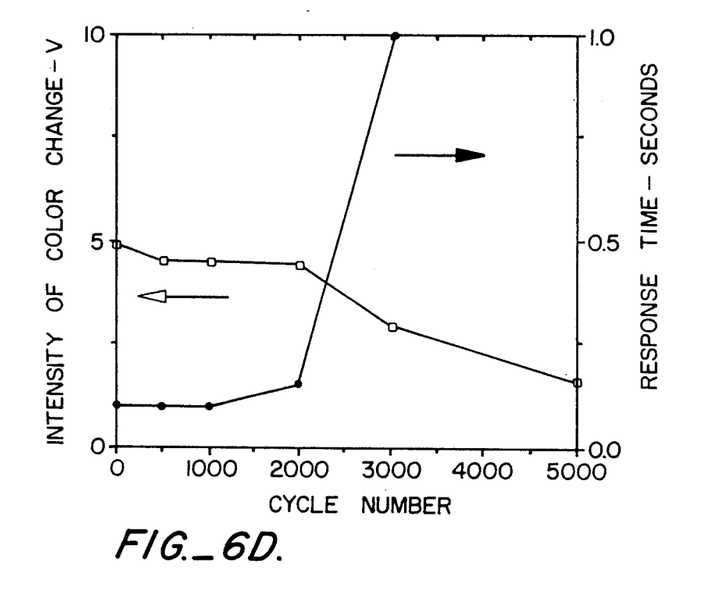

The results are summarized in FIGS. 6A, 6B, 6C and 6D. When the films were tested in 1 M tosylate, a longer cycle life was observed for both films (cf. FIGS. 6A and 6B). These data may suggest that, although 1 M HCl is only slightly more acidic than 1 M tosylate, HCl attacks ITO more aggressively than tosylate. Comparing the performance of the two films in 1 M tosylate closely (of. FIGS. 6C and 6D), it is clear that the polyaniline/tosylate/Ni-Pc/Nafion gives a better cycle life than the polyaniline/HCl films - FIGS. 6A and 6B.

Effect of Incorporation of NAFION ®

Figure 7A:
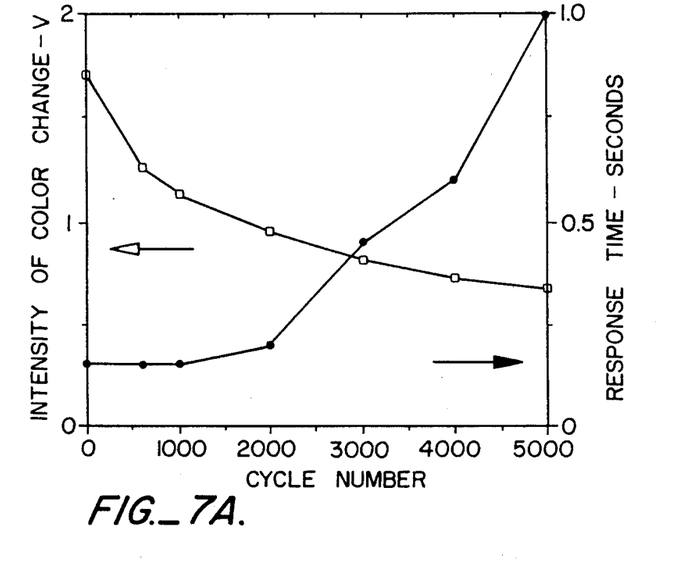
FIGS. 7A and 7B show the results of the effect of Nafion on the lifetime of polyaniline/tosylate/nickel phthalocyanine/ITO electrochromic films.
Figure 7B:
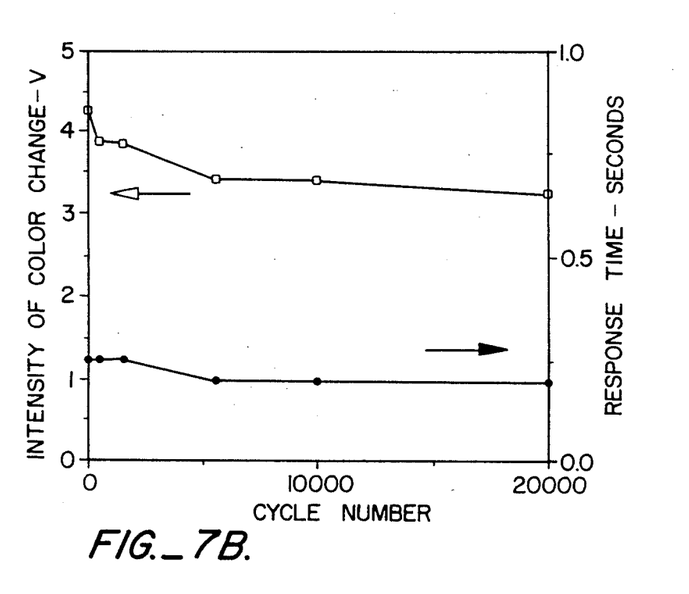

The effect of incorporation of NAFION ® on lifetime of the polyaniline/tosylate/Ni-Pc/ITO electrochromic film was examined. The cycle life test was performed in 1 M tosylate. When one layer of NAFION ® film was cast on the grown film prepared without NAFION ®, a very poor performance was observed (FIG. 7A), compared to the performance of the film prepared into a layer of NAFION ® (cf. FIG. 5B). This suggests that it is important for an electrochromic polyaniline/tosylate/Ni-Pc film to be grown into NAFION ® coated on an electrode. When the film was grown into a thicker NAFION ® (two layers), the performance (FIG. 7B) appears to be further improved; in particular, a greater intensity change was observed. It is likely that NAFION ® would help to stabilize tosylate ions in the polyaniline network.

Effect of Incorporation of Ni-Pc into Polyaniline/Tosylate/NAFION ®/ITO

Figure 8A:
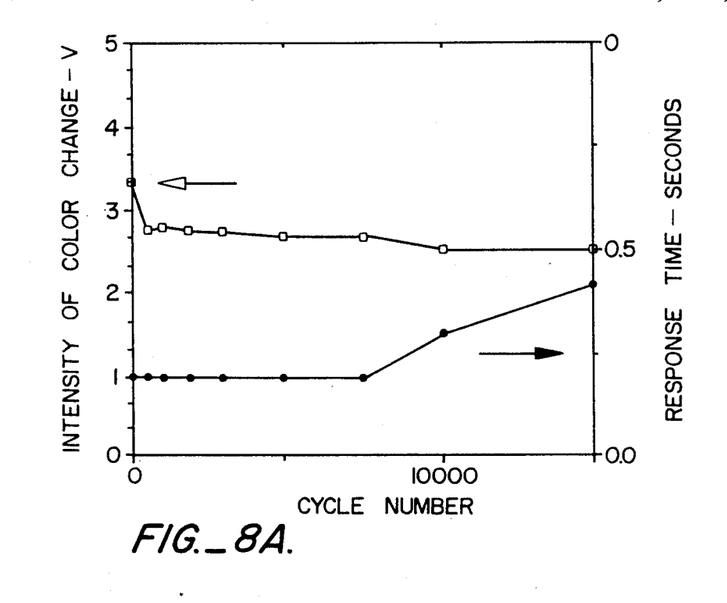
FIGS. 8A and 8B show the effect of the incorporation of nickel phthalocyanine into polyaniline/tosylate/Nafion/ITO electrochromic films.
Figure 8B:
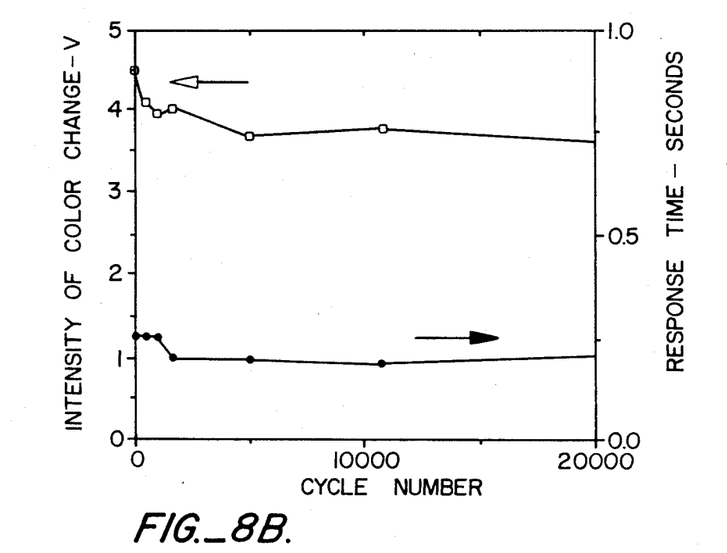

The effect of incorporation of Ni-Pc into the polyaniline/tosylate/NAFION ®/ITO electrochromic film was examined. (FIG. 8A and 8B). The presence of 5 mM of Ni-Pc/ $SO_3$ during the electropolymerization gave no appreciable difference in the performance. This may suggest that Ni-Pc/$SO_3$ ions may not be incorporated into the film when NAFION ® is present because of NAFION ®'S cationic-exchange nature. The presence of Ni-Pc/$SO_3$ ion is essential to form a uniform, homogeneous film of polyaniline/tosylate. However, when the film is grown in NAFION ®, NAFION ® plays the role of Ni-Pc/$SO_3$ to form a uniform film, and no additional Ni-Pc/$SO_3$ ions are necessary.

A new class of electrochromic film based on the self-doped polyaniline/tosylate/NAFION ®/ITO is described. The film is superior to the polyaniline/HCl electrochromic film in terms of durability, which is the most important criterion from the practical point of view. The switching time of our new film (about 0.2 second) is somewhat slower than that of the conventional polyaniline film (about 0.1 second), but is fast enough for most practical applications. For the electrochromic application, unlike the battery application, it is essential to grow the polyaniline/tosylate film into NAFION ®.

The typical lifetime of the polyaniline/tosylate/ NAFION ®/ITO is used in 1 M aqueous tosylate solution is on the order of $10^4$ cycles.

The following Examples are presented for the purpose of description and illustration only. They are not to be construed as being limiting in any way.

The chemicals and reagents are available in high purity reagent grade from chemical supply houses such as Aldrich Chemical of Milwankee, Wisconsin, Kodak, Rochester, New York or those identified in Chemical Sources, U.S.A. published annually by Directories Publishing, Inc., of Columbia, South Carolina. NAFION ® is also available from Solution Technology, Inc. of Philadelphia, Pennsylvania.

EXAMPLE 1

Tetrasulfonate Salt of Nickel-Phthalocvanine (Ni-Pc)

a. The title film was typically prepared from a solution containing 2 M HCl, 1 M aniline, and 1 mM sodium tetrasulfonate Ni-Pc, applying a constant current density of 0.1 mA/cm$^2$ for about 4 minutes on a glass substrate coated with optically transparent indium-doped tin oxide (ITO);

b. In a second example the film was electropolymerized under the same conditions onto ultrathin, optically transparent, platinum.

Materials were obtained from, Aldrich Chemical Company, Inc., Milwaukee, WI.

EXAMPLE 2

For Polyaniline/p-toluenesulfonic acid/NAFION ®

Ethanol-pre-ion-exchanged NAFION ® (50 microliter/cm$^2$) (as the acid form) is solution-cast on the electrode before polymerization. The thickness of NAFION ® is about 1 micrometer. See FIG. 3 for results.

The ITO-coated glass plates (purchased from Technical Glass Products from Corning Glass Works, Corning, N.Y. specified as Corning 7740 glass with a sheet resistance of 5 ohms per centimeter$^2$) were used after one-half hour in an ultrasonic cleaner with trichloroethylene and alcohol. The transparent, ultrathin (about 40- to 50-nm) platinum-coated microscope slide glass substrate were prepared using a sputtering technique, individually tested to ensure that the light transmittance over the visible range was at least twice that of the polymers of interest, and then cleaned ultrasonically in a standard microcontamination cleaner used in the silicon industry. The sheet resistance of the thin platinum layers was approximately 100 ohms per centimeter$^2$.

While only a few embodiments of the invention have been shown and described herein, it will become apparent to those skilled in the art that various modifications and changes can be made in the process to manufacture an electrochromic polymer of polyaniline with metal phthalocyanine, and polyaniline with organic sulfonic acid and NAFION ® and/or GORE-Tex ® without departing from the spirit and scope of the present invention. All such modifications and changes coming within the scope of the appended claims are intended to be carried out thereby.

We claim:

1. An electrochemical process for the production of an electrochromic electrically conductive composite film, which process comprises:
   (a) contacting in an aqueous acid solution, aniline in the acid form with a metal phthalocyanine sulfonic acid in the acid form,
   (b) applying to the aqueous acid solution of step (a) a constant current density of between about 0.01 and 5.0 mA/cm$^2$ for between about 1 and 10 minutes, and
   (c) recovering the electrochromic thin film having improved mechanical properties and improved color characteristics and amplitude.

2. The process of claim 1 wherein in step (a) wherein an acid is present, and the metal in the phthalocyanine is selected from nickel, cobalt, iron or manganese.

3. The process of claim 2 wherein in step (a):
   the acid is hydrochloric acid is present in between about 0.01 and 3 molar (M),
   the aniline is present in between about 0.01 and 1 M and
   the metal phthalocyanine as the tetrasodium salt is added in between about 0.1 to 2.0 mM.

4. The process of claim 3 wherein the hydrochloric acid is present in about 1M,
   the metal phthalocyanine is present in about 1mM; and
   the aniline is present in about 1M.

5. The process of claim 4 wherein the electropolymerization in step (b) is conducted by applying a constant current density of between about 0.05 to 2 mA/cm$^2$ for between about 1 and 10 minutes.

6. The process of claim 5 wherein the current density is between about 0.1 and 1 mA/cm$^2$.

7. The process of claim 2 wherein the metal phthalocyanine is nickel phthalocyanine tetrasulfonic acid in the acid form.

8. The process of claim 1 wherein the step (a), the metal phthalocyanine sulfonic acid is a tetrasulfonic acid added as the sodium salt and sufficient acid is present to obtain the tetraacid form of the tetrasulfonic acid.

9. The process of claim 8 wherein the acid present is hydrochloric acid.

10. The process of claim 1 wherein the step (a) the metal phthalocyanine sulfonic acid is a metal phthalocyanine tetrasulfonic acid in the acid form is first obtained by prior ion exchange of the tetrasodium salt of the metal phthalocyanine tetrasulfonic acid.

* * * * *